3,290,339
AGMATINE DERIVATIVES

Norman Geoffrey Rule and Laszlo Lorand, Evanston, Ill., assignors to Northwestern University, Evanston, Ill., a corporation of Illinois
No Drawing. Filed June 28, 1963, Ser. No. 291,290
4 Claims. (Cl. 260—397.7)

In general, this invention relates to the inhibition of proteolytic enzymes by decarboxylated amino acid derivatives and more specifically to novel agmatine derivatives which are very effective inhibitors of both thrombin and trypsin. The utility of the new compounds thus lies in their ability to interfere with the clotting of thrombin in blood which is extremely important in the treatment of thromboembolic disorders in warm-blooded animals. When blood is contacted with any of the compounds hereinafter described, a great delay in clotting time results.

The hitherto undescribed compounds to which this invention pertains are p-acetamidobenzenesulfonylagmatine and p-succinamidobenzenesulfonylagmatine and their pharmaceutically acceptable, acid-addition salts such as the hydrochloride, hydrobromide, sulfate, acetate, phosphate, benzoate, maleate and other salts which can be prepared by methods well known to those skilled in the art. These compounds can be readily prepared by the reaction at room temperature of equimolar proportions of agmatine and p-acetamidobenzenesulfonyl chloride or p-succinamidobenzenesulfonyl chloride in an inert solvent such as a water-ether mixture and in the presence of an acid acceptor such as triethylamine or pyridine. When the reaction is complete, the water layer is separated and passed through a column packed with a strongly basic, ion exchange resin in the free base form as for example, Dowex-1 or Amberlite IRA–400 which are polystyrene resins containing quaternary ammonium groups crosslinked with from 1 to 10% of divinylbenzene. The eluate is then heated on the steam bath and cooled to precipitate the desired product or neutralized with a dilute acid and lyophilized to obtain the desired acid-addition salt.

The following examples set forth specific embodiments of the best mode contemplated for preparing the compounds but are not to be construed as limiting the invention to the exact proportions or procedures employed therein.

Example 1

A mixture of one gram (0.005 mole) of agmatine sulfate, 10 ml. of water, 0.98 gram (0.01 mole) of triethylamine, 1.13 grams (0.005 mole) of p-acetamidobenzenesulfonyl chloride and 10 ml. of ether was stirred at room temperature for 24 hours. The aqueous layer was then separated and passed through a column containing 20 grams of dry Dowex-1 resin in the free base form. The column was eluted with water and fractions containing the desired product identified by their absorption at 260 millimicrons were combined, neutralized with dilute, aqueous hydrochloric acid and lyophilized to yield 1.2 grams of p-acetamidobenzenesulfonylagmatine hydrochloride which was a solid melting at 210°–211° C.

Example 2

Equimolar proportions of agmatine and p-succinamidobenzenesulfonyl chloride (M.P.=187°–190° C.) were reacted as described in Example 1 and the aqueous layer passed through a Dowex-1 ion exchange resin column. Fractions of the eluate containing the desired product were combined, made weakly acidic and heated on the steam bath for 2 hours. Upon cooling, the p-succinamidobenzenesulfonylagmatine precipitated and was found to melt at 130° C. A portion of the product was dissolved in dilute, aqueous hydrochloric acid and upon lyophilization gave a white solid melting at 150° C.

We claim:
1. A compound selected from the group consisting of p-acetamidobenzenesulfonylagmatine, p-succinamidobenzenesulfonylagmatine and pharmaceutically acceptable, acid-addition salts thereof.
2. p-Acetamidobenzenesulfonylagmatine hydrochloride.
3. p-Succinamidobenzenesulfonylagmatine.
4. p-Succinamidobenzenesulfonylagmatine hydrochloride.

References Cited by the Examiner

Elsevier: Chemistry of Carbon Compounds, vol. IB, pages 930–931, Elsevier Pub. Co. (N.Y.), 1952.

Northey: The Sulfonamides and Allied Compounds, pages 11–14, 16–17, 22–23 and 57–58, Reinhold Pub. Corp., N.Y. (1948).

Streatfield: Chemistry and Industry, pages 1214, 1218 and 1220–1221 (1953).

Winters et al.: Ind. and Eng. Chem., vol. 41, pages 460–463 (1949).

JOHN D. RANDOLPH, *Primary Examiner.*